(12) United States Patent
Kim

(10) Patent No.: US 7,726,705 B2
(45) Date of Patent: Jun. 1, 2010

(54) LOCKING DEVICE OF TRAY FOR VEHICLE

(75) Inventor: Byoung Wook Kim, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/646,116

(22) Filed: Dec. 26, 2006

(65) Prior Publication Data

US 2008/0100068 A1    May 1, 2008

(30) Foreign Application Priority Data

Oct. 18, 2006   (KR) ...................... 10-2006-0101585

(51) Int. Cl.
*E05C 1/08*   (2006.01)
(52) U.S. Cl. ................ 292/163; 292/DIG. 37; 292/169.18
(58) Field of Classification Search ............... 292/163, 292/DIG. 370, 137, 156, 157, 164, 8, 24, 292/25, 32, 33, 95, 116, 121, DIG. 4, 169.21, 292/170, 169.14, 169.13
See application file for complete search history.

(56) References Cited

U.S. PATENT DOCUMENTS

| | | | | |
|---|---|---|---|---|
| 1,064,313 A | * | 6/1913 | Garlock ....................... | 292/60 |
| 2,252,591 A | * | 8/1941 | Anderson ..................... | 292/63 |
| 5,688,001 A | * | 11/1997 | Klein et al. ................... | 292/67 |
| 6,869,114 B2 | * | 3/2005 | Ueki ...................... | 292/341.17 |
| 7,234,735 B2 | * | 6/2007 | Harada ........................ | 292/170 |
| 2006/0103140 A1 | * | 5/2006 | Bella et al. .................... | 292/95 |
| 2007/0120376 A1 | * | 5/2007 | Bella ........................... | 292/163 |

FOREIGN PATENT DOCUMENTS

| | | |
|---|---|---|
| JP | 08-312225 | 11/1996 |
| KR | 1993-0017379 | 7/1993 |
| KR | 20-0255456 | 11/2001 |

\* cited by examiner

*Primary Examiner*—Peter M. Cuomo
*Assistant Examiner*—Mark Williams
(74) *Attorney, Agent, or Firm*—Morgan, Lewis & Bockius LLP

(57) ABSTRACT

A locking device of a tray includes a button; a first hooking part connected to an end of the button and including a support rod, movable in a first direction within a through hole formed in a base plate, and a hooking projection which is locked to or released from a hooking groove; a return spring interposed between the first hooking part and the base plate so as to provide elastic force to the first hooking part; and a second hooking part which is attached to a slanted slot in a side of the first hooking part so as to move in a slantwise direction with respect to the first hooking part.

3 Claims, 4 Drawing Sheets

LOCKING DEVICE OF TRAY FOR VEHICLE

CROSS-REFERENCE TO RELATED APPLICATION

This application claims priority to and the benefit of Korean Patent Application No. 10-2006-0101585 filed in the Korean Intellectual Property Office on Oct. 18, 2006, the entire contents of which are incorporated herein by reference.

BACKGROUND OF THE INVENTION (a) Field of the Invention

The present invention relates to a locking device of a tray for a vehicle, and more particularly to a locking device of a tray for a vehicle which prevents a door of a tray from being opened by vertical and horizontal movements of the door.

(b) Description of the Related Art

Generally, a tray, such as an ashtray, cup holder, or CD tray, is provided in a passenger compartment of a vehicle. A cover is rotatably connected to a front portion of the tray to open and close the tray.

A locking device such as a latch is used to keep the tray closed. A hooking groove is provided inside the tray, and a hooking projection is provided to the door and can be fitted into the hooking groove.

When the hooking projection is separated from the hooking groove by an unexpected impact such as a collision, the door may open.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a locking device of a tray for a vehicle that prevents a door of the tray from being opened by vertical and horizontal movements thereof. The device includes a second hooking part, for locking in a vertical direction, and a first hooking part, for locking in a horizontal direction.

An exemplary embodiment of the present invention provides a locking device of a tray for a vehicle with a double locking structure which prevents the door from being opened by movements in both the vertical and horizontal directions.

The double locking structure may include: a button; a first hooking part connected to a lower end of the button and including an integration of a support rod which can descend and ascend in a through hole formed in a base plate, and a hooking projection which is locked to a first hooking groove; a return spring interposed between the first hooking part and the base plate so as to provide elastic force to the first hooking part; and a second hooking part which is attached to a slanted slot in a side of the first hooking part by a pin so as to move forward and rearward, for being locked to or released from a second hooking groove.

The double locking structure may be formed in a housing and the base plate may close a lower end of the housing and elastically support the return spring.

The slot may be slanted by 45° in a rear upward direction.

DETAILED DESCRIPTION OF THE PREFERRED EMBODIMENTS

Figure 1:
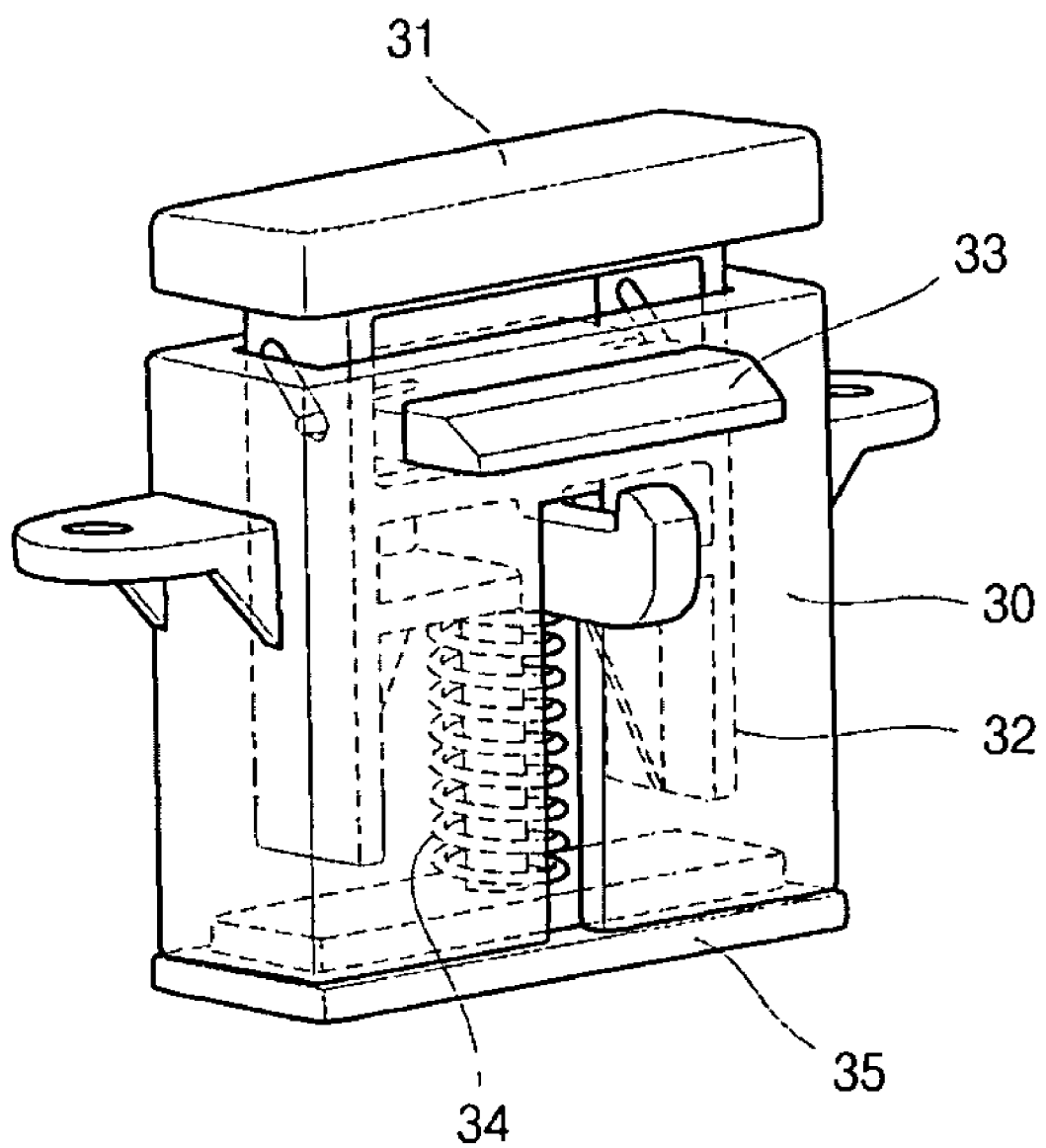
FIG. 1 is a perspective view of a locking device of a tray for a vehicle according to an exemplary embodiment of the present invention.

An exemplary embodiment of the present invention will hereinafter be described in detail with reference to the accompanying drawings.

A locking device of a tray according to an exemplary embodiment of the present invention includes a double locking structure in which if a button 31 is pushed downward in the drawings, a first hooking part 32 which is connected to the button 31 descends to release locking in a horizontal direction, and at the same time a second hooking part 33 which is attached to the first hooking part 32 by a pin moves rearward to release locking in a vertical direction.

A door 20 is rotatably connected to a front portion of a tray 10 to open and close the tray 10.

A first hooking groove 21a for locking the first hooking part 32 and a second hooking groove 21b for locking the second hooking part 33 is provided to a side of the tray near the door 20.

Figure 2:
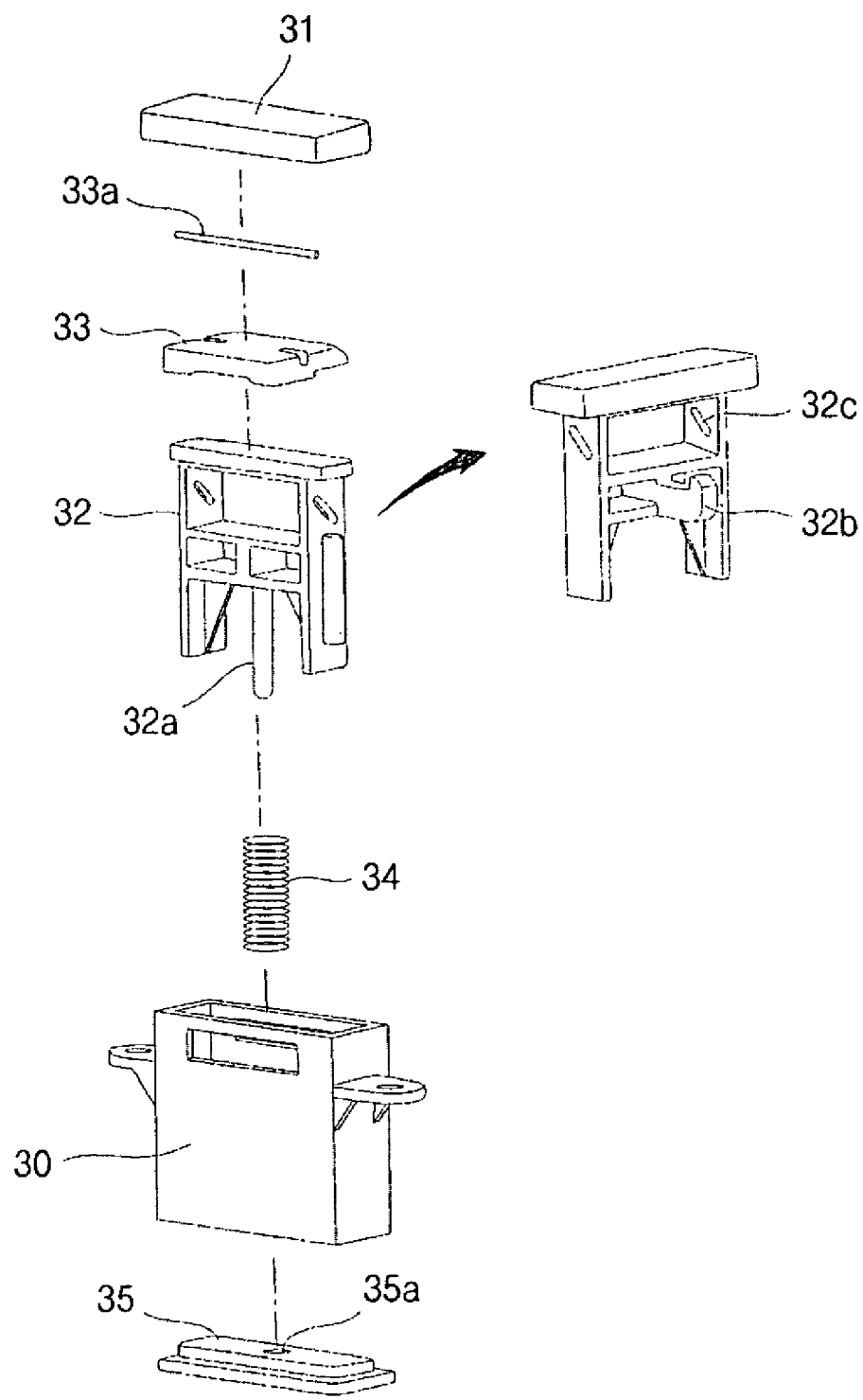
FIG. 2 is an exploded perspective view of the locking device of FIG. 1.
Figure 3A:
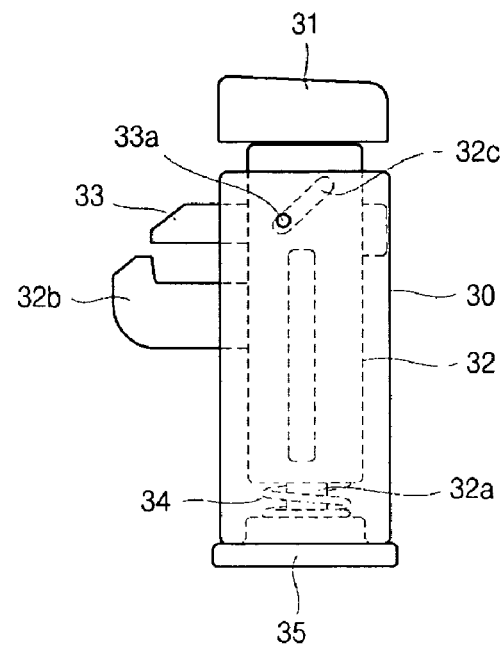
FIG. 3A and FIG. 3B are side views showing operation of the locking device of FIG. 1.
Figure 3B:
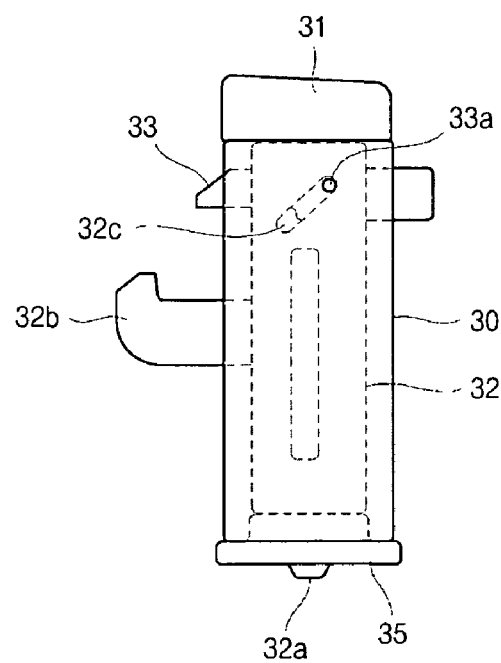

Referring to FIG. 1 and FIG. 2, a housing 30 and a base plate 35, which closes a lower end of the housing 30 and elastically supports a return spring 34, are connected to a front portion of the door 20 of the tray 10.

The double locking structure includes: the button 31; the first hooking part 32 which is connected to a lower end of the button 31 and includes a support rod 32a which can descend and ascend in a through hole 35a in the base plate 35, and a hooking projection 32b which is locked to the first hooking groove 21a at a side thereof; the return spring 34 interposed around the support rod 32a, between the first hooking part 32 and the base plate 35 to provide elastic force to the first hooking part 32; and the second hooking part 33 which is fixed to a slanted slot 32c in a side of the first hooking part 32 by a pin 33a so as to move forward and rearward, for being locked to or released from a second hooking groove.

Operations of a locking device of a tray for a vehicle according to an exemplary embodiment of the present invention will be explained hereinafter.

Figure 4A:
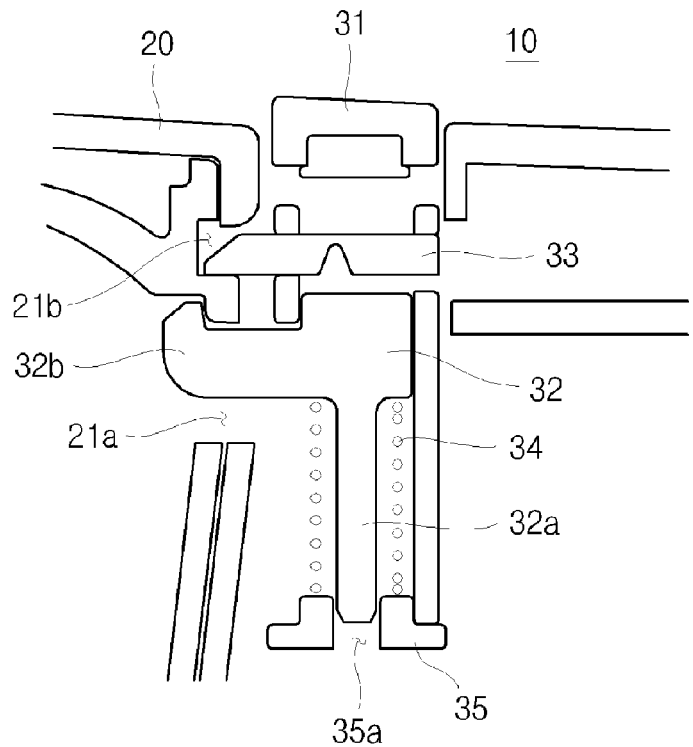
FIG. 4A and FIG. 4B are cross-sectional views illustrating a relationship between the tray and the locking device of FIG. 1.

As shown in FIG. 4A, if the button 31 is pushed down, the hooking parts 32 and 33 are released from the hooking grooves 21a and 21b.

Figure 4B:
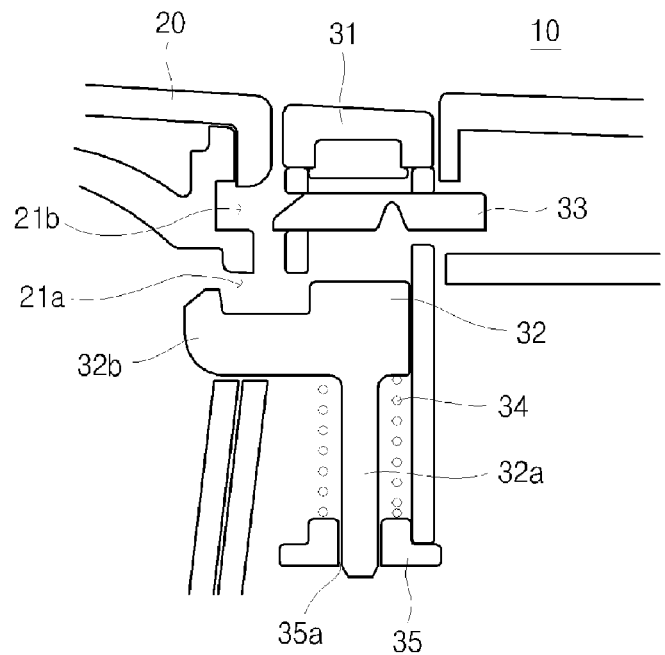

That is, hooking parts 32 and 33 are simultaneously separated from the hooking grooves 21a and 21b as shown in FIG. 4B. The second hooking part 33 moves rearward (right in FIG. 4), and the first hooking part 32 moves downward.

In more detail, if the button 31 is downwardly pushed, the first hooking part 32 which is connected to the button 31 moves downwardly, and the support rod 32a of the first hooking part 32 then downwardly moves along the through hole 35a of the base plate 35 and is released from the first hooking groove 21a.

At the same time, the second hooking part 33 which is fixed to the slanted slot 32c formed at a side of the first hooking part 32 by the pin 33a moves along the slot 32c. Since the slot 32c is slanted by 45° in a rear upward direction, the first hooking part 32 moves down, and the second hooking part 33 moves rearward.

Since the return spring 34 applies elastic force to the first hooking part 32, the structure returns to the original state if a user does not apply force to the button 31.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lockable tray for a vehicle, comprising:
   a compartment;
   a door movable with respect to the compartment; and
   a lock device selectively locking the tray so as to selectively lock the door, including:
   a housing;
   a button mounted slidably within the housing along a line of motion having a first direction and opposing second direction;
   a first hooking part connected to an end of the button and comprising a support rod, movable in the first direction within a through hole formed in a base plate of the housing, and a hooking projection which is locked to or released from a first hooking groove formed in the door;
   a return spring interposed between the first hooking part and the base plate so as to provide elastic force to the first hooking part; and
   a second hooking part which is slidably coupled to a slanted slot formed in a side of the first hooking part so as to allow the second hooking part to move in a diagonal direction with respect to the first hooking part as well as the housing, thereby being locked to or released from a second hooking groove formed in the door by movement of the button along the first direction or the second direction, respectively.

2. The locking device of claim 1, in which the hooking parts and return spring are disposed in the housing, wherein the base plate closes an end of the housing and elastically supports the return spring.

3. The locking device of claim 1, wherein the slot is slanted by approximately 45° with respect to the first direction.

* * * * *